T. A. BRETT.
DIRECTION INDICATOR FOR MOTOR VEHICLES.
APPLICATION FILED FEB. 23, 1921.
1,388,795.
Patented Aug. 23, 1921.
2 SHEETS—SHEET 1.
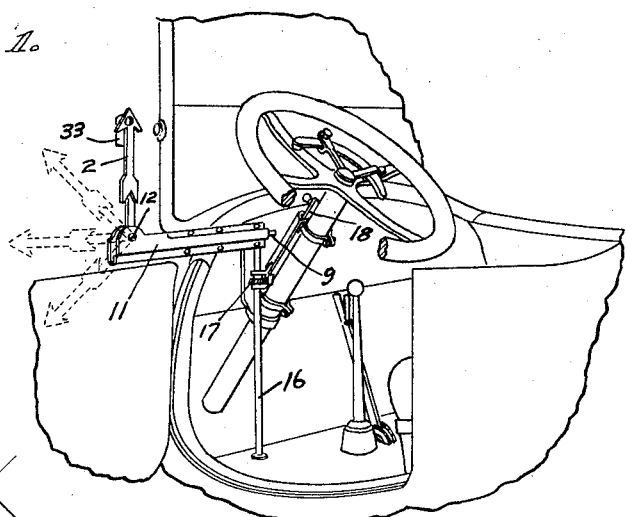
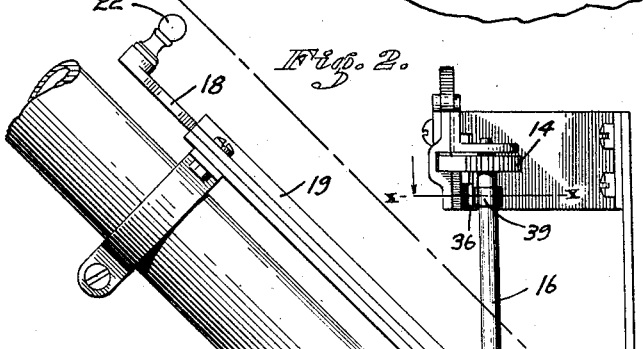
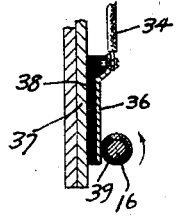
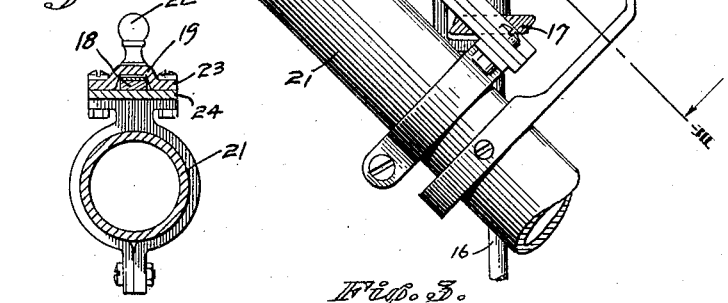
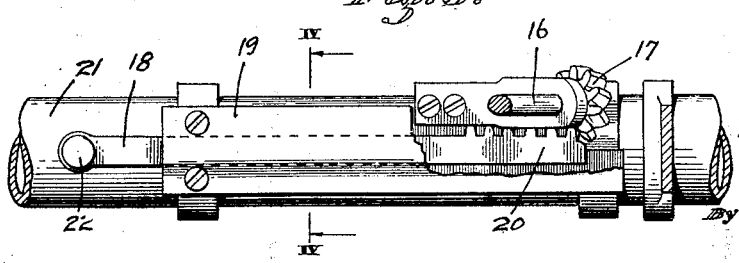
Inventor
THOMAS A. BRETT
By Munn & Co
Attorneys.

T. A. BRETT.
DIRECTION INDICATOR FOR MOTOR VEHICLES.
APPLICATION FILED FEB. 23, 1921.
1,388,795.
Patented Aug. 23, 1921.
2 SHEETS—SHEET 2.
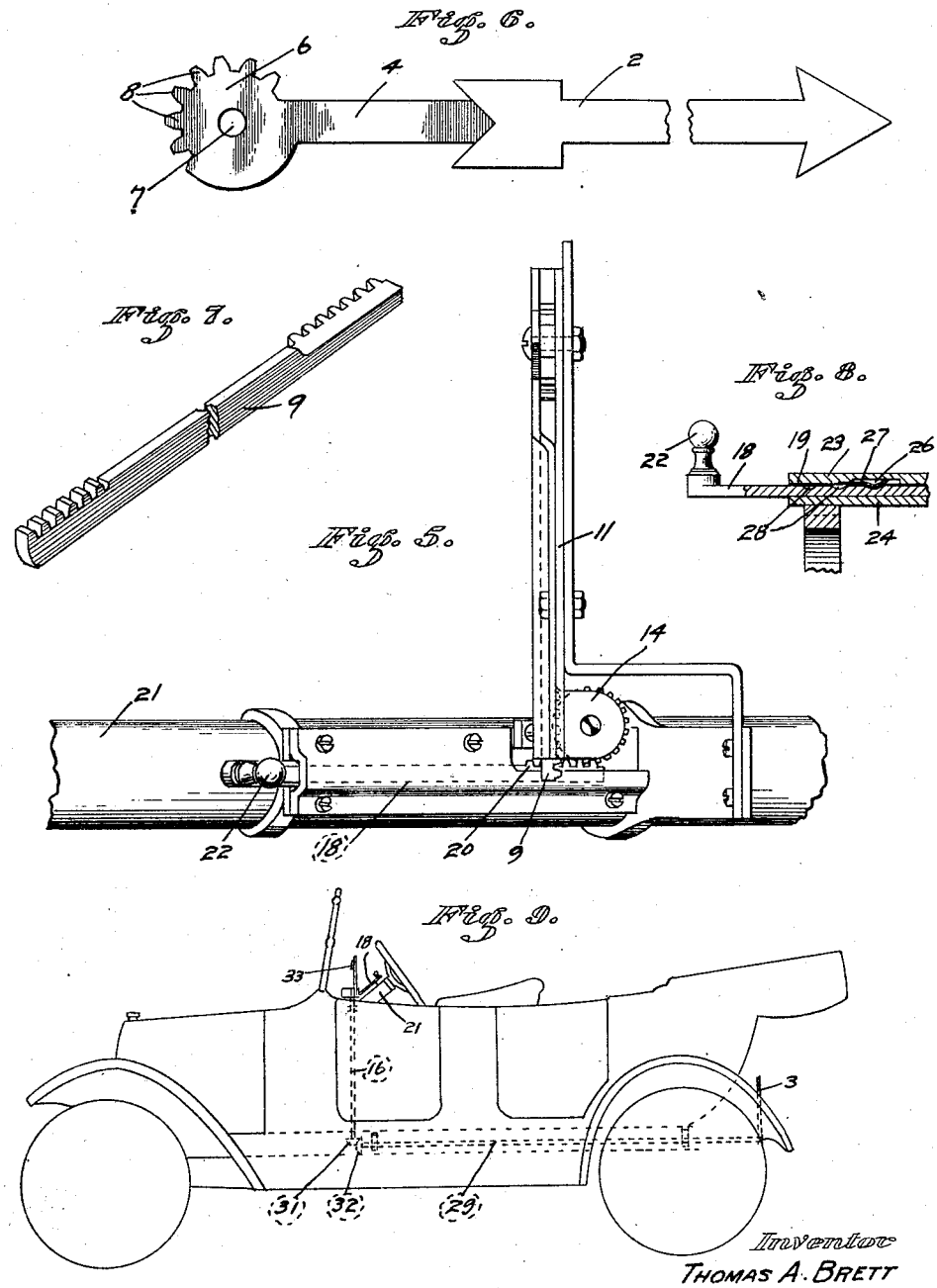
Inventor
THOMAS A. BRETT
Attorneys.

UNITED STATES PATENT OFFICE.

THOMAS A. BRETT, OF PITTSBURG, CALIFORNIA.

DIRECTION-INDICATOR FOR MOTOR-VEHICLES.

1,388,795.　　　　　Specification of Letters Patent.　　Patented Aug. 23, 1921.

Application filed February 23, 1921. Serial No. 447,063.

*To all whom it may concern:*

Be it known that I, THOMAS A. BRETT, a citizen of the United States, and a resident of Pittsburg, county of Contra Costa, and State of California, have invented a new and useful Improvement in Direction-Indicators for Motor-Vehicles, of which the following is a specification.

The present invention relates to improvements in direction indicators for automobiles, and its object is to provide a means by which the driver of a motor driven vehicle can conveniently indicate to the driver of any other vehicle traveling in the same or in the opposite direction, the fact that he wishes to stop, or to turn to the left or to the right. A specific advantage of my device is that it indicates the course to be pursued by the vehicle in front as well as in the rear, and that the mechanism, apart from some illuminating features, is actuated solely by mechanical means and by mere mechanical movements of the most substantial and approved character.

Other objects and advantages will appear as the description proceeds.

I attain these objects by means of the mechanism illustrated in the accompanying drawing, in which Figure 1 is an inside view of a motor driven vehicle, showing the steering apparatus and the main parts of my indicating device attached thereto; Fig. 2 is a side elevation of the steering rod casing and parts of my device, looking at the same from the right side; Fig. 3 is a sectional view along the line 3—3 of Fig. 2; Fig. 4 is a sectional view along the line 4—4 of Fig. 3; Fig. 5 is a plan view of my device attached to the steering rod casing; Fig. 6 is an enlarged detail view of an arrow indicator; Fig. 7 an enlarged detail view of a rack-rod; Fig. 8 an enlarged detail view, partly sectional, of a sliding rod, showing a particular locking device for the same; Fig. 9 is a side view of a motor vehicle showing my device diagrammatically, and Fig. 10 is a sectional detail view along the line 10—10 of Fig. 2.

To allow the driver of an automobile to indicate a turn to the left or to the right, or a stop, intended by him, I use two arrows, (2) and (3), one being in front and one in the rear of the automobile. The arrow (2) is provided with a rearward extension (4) terminating in a disk (6) having a central hole (7) and a plurality of sprockets (8) covering about one-half of its circumferential surface.

Confining myself to the front arrow first, I show the arrow in Fig. 1 as standing upright, which is its neutral position. Three other positions, illustrated by dotted lines, are intended to indicate a stop, a turn to the left, or a turn to the right. The arrow is actuated by a horizontal rack-rod (9), shown in detail in Fig. 7, either end of the same being racked on adjoining sides. This rack-rod is inclosed in a casing (11) and one end of it engages the mutilated gear of the arrow, the disk of which is pivotally supported in the same casing, as shown at (12). The other end of the rack-rod is reciprocated by a gear (14) provided at the upper end of the vertical shaft (16) which carries at a convenient height a worm wheel (17) adapted to receive a rotating motion from a rack (20) secured to the lower end of a slidable push-rod (18) inclosed in a casing (19) fastened to the casing (21) of the steering rod. The rod (18) is provided at the top with a handle (22) which is within convenient reach of the driver. It will thus be seen that by pushing down on the handle (22) the driver can actuate the arrow to assume any of the three positions shown in dotted lines in Fig. 1. To cause the arrow to always stop at one of the three clearly defined places, and not at any intermediate points, I provide a peculiar spring action for the push-rod (18) shown in detail in Fig. 8. The rod fits snugly between the upper wall (23) and the lower wall (24) of the casing (19) and a recess (26) is cut into the upper wall to provide space for a small leaf spring (27). An outward bend in this spring fits into any of the three corresponding notches (28) on the push-rod (18). Thus a tendency is created for the push-rod to stop whenever the bent part of the spring rests in one of the notches, and then only, and the gearing is arranged so that at those times the arrow occupies one of the three positions indicated by the dotted lines in Fig. 1.

The vertical shaft (16) at the same time actuates the rear arrow (3) by means of the horizontal rod (29) connected to the vertical shaft by means of two bevel gears (31) and (32) and carrying at its rearward end the arrow.

In order to cause the indicator to show up better at night, when in one of the three direction indicating positions, I provide an electric lamp (33) in the same, included in a circuit for which the shaft (16) acts as a switch, as shown in Fig. 10. Here it will be seen that one wire (34) of the circuit is connected to a contact plate (36) secured to the dash board (37), insulating material (38) being interposed between the plate and the dash. The shaft (16) carries a collar (39) which is in constant contact with the contact plate (36). That part of the collar which is in contact with the plate while the indicator is in its neutral position consists of insulating material, while the other part is metallic and electrically connected to the other wire. A lamp on the rear arrow is connected into the same circuit.

I claim:

1. A direction indicator for a motor vehicle, comprising a rack rod slidably mounted on and parallel to the steering post with freedom of longitudinal motion, a vertical shaft having a worm gear thereon adapted to be rotated by a longitudinal motion of the rack rod, a second horizontal rack rod mounted parallel to the dash board with freedom of longitudinal motion, an operative connection between the shaft and the second rack rod, an indicating arm pivotally supported over one end of the second rack rod having a toothed segment adapted to be engaged by the rack rod, whereby the indicating arm may be swung on its pivot, a spring operatively connected with the first rack rod being adapted to intermittently impede the longitudinal motion of the same whereby the arm is caused to stop in one of several clearly defined indicating positions.

2. A direction indicator for a motor vehicle, comprising a rack rod slidably mounted on and parallel to the steering post with freedom of longitudinal motion, a vertical shaft having a worm gear thereon adapted to be rotated by a longitudinal motion of the rack rod, a second horizontal rack rod mounted parallel to the dash board with freedom of longitudinal motion, an operative connection between the shaft and the second rack rod, an indicating arm pivotally supported over one end of the second rack rod having a toothed segment adapted to be engaged by the rack rod, whereby the indicating arm may be swung on its pivot, a spring operatively connected with the first rack rod being adapted to intermittently impede the longitudinal motion of the same whereby the arm is caused to stop in one of several clearly defined indicating positions, a second shaft longitudinally mounted in the motor vehicle having an indicating arm rearwardly of the car, and an operative connection between the two shafts whereby the rear indicating arm is caused to give the same signal as the front indicating arm.

THOMAS A. BRETT.